M. W. MURRAY.
APPARATUS FOR PRODUCING CARBID.
APPLICATION FILED JAN. 30, 1912.
1,052,165.
Patented Feb. 4, 1913.
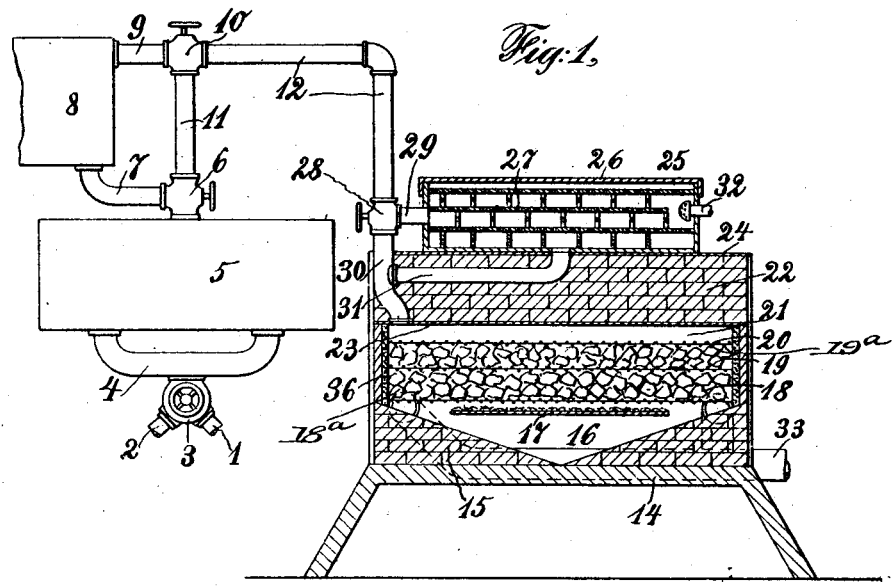
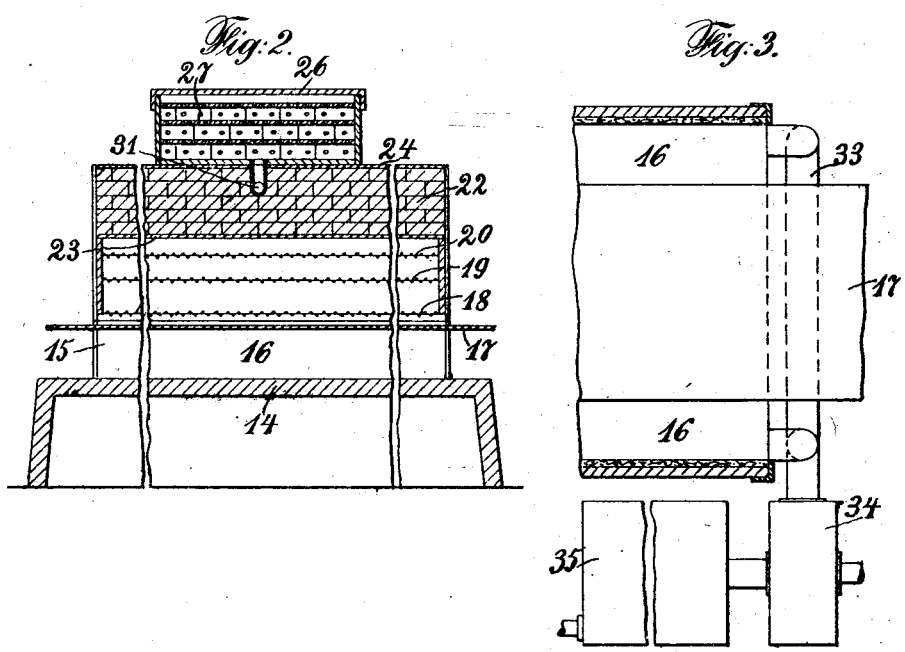
Witnesses:
Inventor
Michael W. Murray
By his Attorney

UNITED STATES PATENT OFFICE.

MICHAEL W. MURRAY, OF NEW YORK, N. Y., ASSIGNOR OF FIFTY ONE-HUNDREDTHS TO GEORGE H. ROSENBLATT, OF NEW YORK, N. Y.

APPARATUS FOR PRODUCING CARBID.

1,052,165. Specification of Letters Patent. Patented Feb. 4, 1913.

Application filed January 30, 1912. Serial No. 674,347.

*To all whom it may concern:*

Be it known that I, MICHAEL W. MURRAY, a citizen of the United States of America, and a resident of New York, county and State of New York, have invented certain new and useful Improvements in Apparatus for Producing Carbid, of which the following is a specification.

This invention has reference to a novel apparatus for producing high heat from gas mixtures.

The furnace is particularly designed for the production of such high temperatures as are required, for instance, in the manufacture of calcium carbid, carborundum, and the like.

For the production of calcium carbid, for instance, processes are employed of a purely thermal character and the cost of production depends entirely on the method employed for generating the caloric energy to which the mixture of the prepared components of the substance to be made is subjected usually for fusion. Such high temperatures as are required for making calcium carbid are produced usually with the electric arc which is relatively expensive even when the current is generated by water power. This limits the application of the final product and in some instances renders its use prohibitive.

It is the purpose of the present invention to produce a furnace by means of which such high temperatures may be obtained at a greatly reduced cost and according to purely chemical methods. This has been primarily attained by my novel furnace in which gas mixtures are combusted through surface resistance whereby a surface combustion is obtained. Means are provided for mixing air and gas and carbureting same, and means for subjecting the material to be fused, as for instance, in the production of calcium carbid to the action of the exceedingly high temperature produced by the furnace.

In order to render the invention entirely clear, reference is made to the accompanying drawing in which:

Figure 1 represents in vertical central section a furnace for producing exceedingly high temperatures by gas mixtures which embodies in desirable form the present improvements. Fig. 2 illustrates same in longitudinal section with parts broken away and Fig. 3 is a horizontal section of certain parts of the apparatus with a conveyer pit and endless apron.

Similar characters of reference denote like parts in all the figures.

In the drawing 1 represents the air inlet, 2 is the gas inlet and 3 a valve for both inlets. A pipe 4 leads from said valve to a mixing chamber 5. Above the mixing chamber there is a valve 6 from which a pipe 7 leads to a super-heater 8 wherein the mixture of gas and air may be heated in any suitable manner. From the super-heater a pipe 9 connects with a valve 10 and a second vertical pipe 11 connects the valves 6 and 10. In this manner the gas mixture may be conducted into the furnace without passing the super-heater which may be desirable in certain instances. A pipe 12 leads from the valve 10 horizontally and is bent at a right angle to pass into the furnace.

The construction of the furnace is relatively simple. There is a steel foundation 14 which supports regular brick work 15 leaving however a conveyer pit 16 through which a conveyer 17 passes during the operation of the furnace, as will be more fully described hereinafter. Above the conveyer 17 there are several diaphragms of wire net work with asbestos packing. Three diaphragms are shown on the drawing and designated 18, 19, and 20. Between these diaphragms there are beds of small pieces of highly refractory materials $18^a$, $19^a$ as shown in Fig. 1 such as suitable refractory metal oxids for instance thorium oxid. These refractory oxids represent the surface resistance, whereby a surface combustion is obtained. These oxids are heated by the combusting gas mixture and when in an incandescent condition do not only offer a great surface to the combustion gas, but also aid in the decomposition of the components of the gas mixture as a contact substance, whereby exceedingly high tempertures are obtained. Above the diaphragm 20 there is a space 21 which is the feed box for the furnace into which the gas mixture passes. Above this space regular brick work is provided which is held in place preferably by a bottom metal plate 23 and a top metal plate 24.

Above the top plate 24 of the regular brick work there is a carbureter 25 closed on all sides and having a top cover 26 and some side openings for pipe work. The carbureter is filled by checker brick work 27 to facilitate the process of carbureting. In the pipe 12 adjoining the carbureter there is a valve 28 from which a pipe 29 connects with the carbureter so that the mixture of air and gas may be introduced therein. From this valve 28 another pipe 30 leads vertically down into the feed box 21 so that communication may directly be established between the gas and air supply and the feed box should this be found desirable in certain applications. At the bottom of the carbureter there is a pipe 31 leading from same into the pipe 30. It is evident that the valve 28, as well as the valves 6 and 10, must be two way valves to answer the purpose required. On the right side of the carbureter there is a spray valve 32 through which the carbureting substances are introduced in the form of gas. At the rear end of the furnace pipes 33 are provided which lead into a blower 34. This blower in turn connects with a storage tank 35 where the exhaust gases are collected. In this way the exhaust gases may be utilized for any purpose desired. On the inner side walls adjoining the diaphragms 18, 19, and 20 the furnace is lined with asbestos packing 36 to protect said walls and retain the heat within.

For carbureting the mixture of gas and air hydrocarbons are used which are rich in carbon. For instance such substances as have two or more automatic connections between two carbon atoms like ethylene of the fatty series, or hydrocarbons of the aromatic series having preferably more than one ring or nucleus in the molecule. For exceedingly high temperatures vapors of picric acid 2-4-6 trinitrophenol may be used as a carbureting substance.

I claim as my invention:

1. An apparatus for producing high heat from gas mixtures, comprising means for mixing air and gas, means for super-heating the gas mixture, and a furnace consisting essentially of bottom brick work with a conveyer pit therein, a conveyer for the raw material within said pit, diaphragms of wire net work with refractory packing thereon in the space above the conveyer pit, beds of small pieces of refractory substances between said diaphragms forming a highly refractory surface resistance to the combusting gas mixture, and means for introducing the gas mixture above said diaphragms.

2. An apparatus for producing high heat from gas mixtures, comprising means for mixing air and gas, means for super-heating the gas mixture, and a furnace consisting essentially of bottom brick work with a conveyer pit therein, a conveyer for the raw material within said pit, diaphragms of wire net work with refractory packing thereon in the space above the conveyer pit, beds of small pieces of refractory substances between said diaphragms forming a highly refractory surface resistance to the combusting gas mixture, and a gas feed box above said diaphragms into which the super-heated gas mixture is conducted.

3. An apparatus for producing high heat from gas mixtures, comprising means for mixing air and gas, means for super-heating the gas mixture, and a furnace consisting essentially of bottom brick work with a conveyer pit therein, a conveyer for the raw material within said pit, diaphragms of wire net work with refractory packing thereon in the space above the conveyer pit, beds of small pieces of refractory substances between said diaphragms forming a highly refractory surface resistance to the combusting gas mixture, a gas feed box above said diaphragms into which the super-heated gas mixture is conducted, and a carbureter with checker brick work therein, in the central top portion of the furnace adapted to be connected with the gas feed box.

4. An apparatus for producing calcium carbid, comprising a furnace, consisting essentially of bottom brick work with a conveyer pit formed therein, a conveyer for the coke and lime mixture within said pit, diaphragms of wire net work with asbestos packing thereon in the space above the conveyer pit, beds of small pieces of thorium oxid between said diaphragms forming a highly refractory surface resistance to the combusting gas mixture, a gas feed box above the diaphragms, brick work above said feed box, a carbureter with checker brick work within on the top center portion of the furnace adapted to be connected with the gas feed box, and means for removing and storing the exhaust gases.

5. In apparatus for producing calcium carbid, a furnace comprising a number of diaphragms of wire net work with refractory packing thereon, beds of small pieces of refractory substances between said diaphragms forming a highly refractory surface resistance, means for passing gas mixtures through same, a conveyer pit below said diaphragms, and a conveyer passing through same.

6. In apparatus for producing calcium carbid, a furnace comprising a number of diaphragms of wire net work with refractory packing thereon, beds of small pieces of refractory substances between said diaphragms forming a highly refractory surface resistance, means for passing gas mixtures through same, a conveyer pit below said diaphragms, and a conveyer passing through same, and pipes at the rear end of the furnace for conducting away the exhaust gases.

7. In apparatus for producing calcium carbid, a furnace, means therein for forming a highly refractory surface resistance to the combusting gas mixture, means for conveying the coke and lime mixture through the heated zone, a carbureter at the top central portion of the furnace with checker brick work within, and a pipe for conducting away the carbureted gases.

Signed at New York, N. Y., this 27th day of January 1912.

MICHAEL W. MURRAY.

Witnesses:
 MARIE H. LEHR,
 EMMA A. McCARRICK.